United States Patent [19]

Aihara et al.

[11] Patent Number: 4,771,412

[45] Date of Patent: Sep. 13, 1988

[54] COOLING DEVICE FOR OPTICAL INFORMATION RECORDING AND REPRODUCING APPARATUS

[75] Inventors: Takao Aihara, Tokyo; Satoshi Okabe; Takashi Ogiwara, both of Ina, all of Japan

[73] Assignee: Olympus Optical Co., Ltd., Tokyo, Japan

[21] Appl. No.: 905,432

[22] Filed: Sep. 10, 1986

[30] Foreign Application Priority Data

Sep. 10, 1985 [JP] Japan .................................. 60-201260

[51] Int. Cl.$^4$ .............................................. G11B 33/02
[52] U.S. Cl. ................................................. 369/75.1
[58] Field of Search ............... 369/176, 264, 196, 191, 369/75.1, 292, 77.2, 53, 243, 75.2

[56] References Cited

U.S. PATENT DOCUMENTS

| | | | |
|---|---|---|---|
| 3,912,278 | 10/1975 | Teutsch | 369/75.1 |
| 4,455,636 | 6/1984 | Tsutsui et al. | 369/72 |
| 4,476,556 | 10/1984 | Nagami et al. | 369/77.2 X |
| 4,578,787 | 3/1986 | Shimizu et al. | 369/77.2 |

*Primary Examiner*—David Werner
*Attorney, Agent, or Firm*—Armstrong, Nikaido, Marmelstein & Kubovcik

[57] ABSTRACT

In an optical information recording/reproducing apparatus (2) such that a carriage (7), on which an optical pickup (5) for collectively applying a light beam on a recording medium (11) for information recording and reproduction is mounted, is movable along a movement passage (52) formed in a recessed portion (6) of a deck (4) by a movable mechanism (24) housed in the same recessed portion, cooling air introduced by a cooling device (1) using a fan (43) is blown against the movable mechanism (24) and the blown air is guided toward an exhaust side through a movement passage (52) formed in the vicinity of the movable mechanism (24).

8 Claims, 5 Drawing Sheets

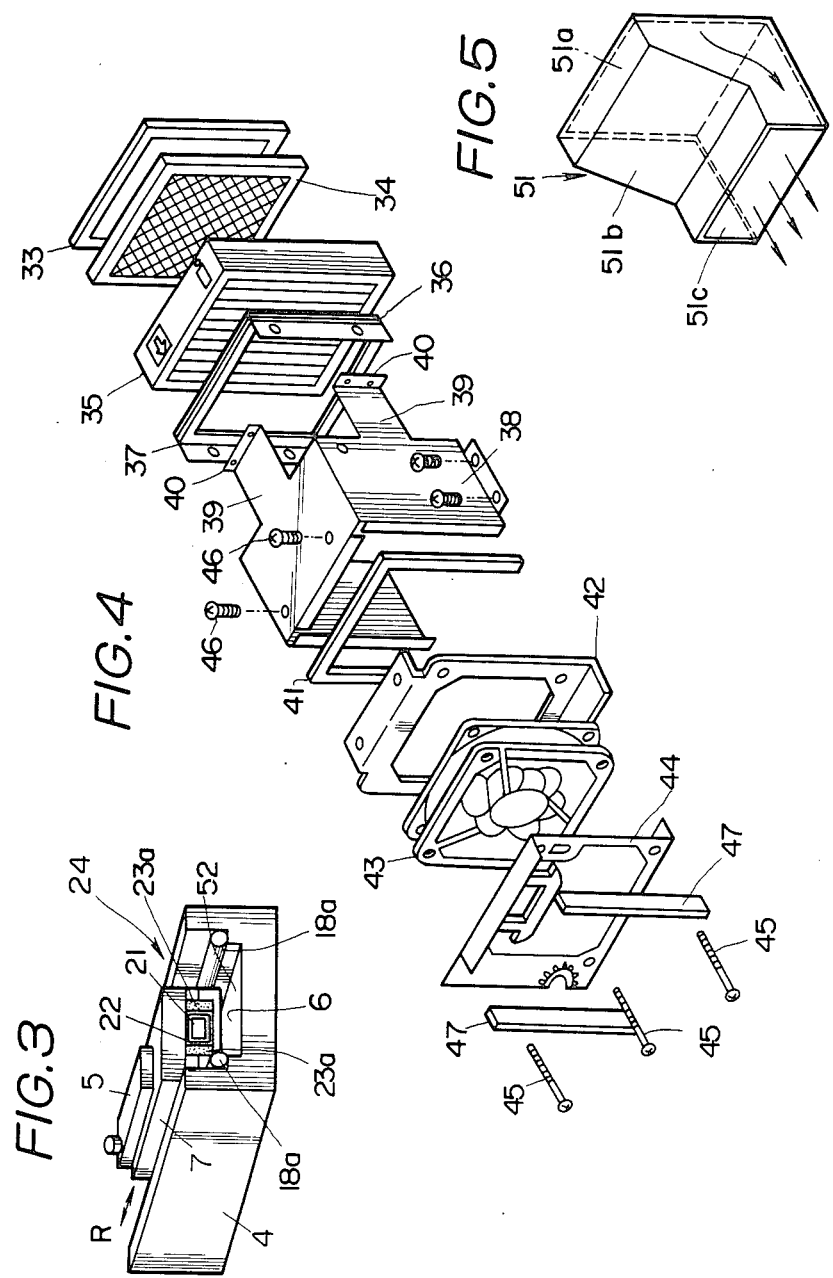

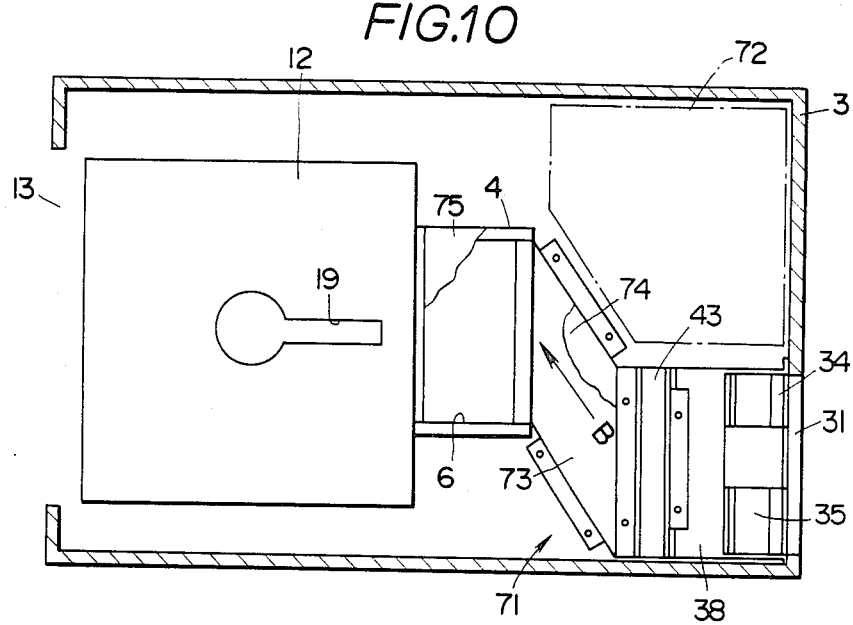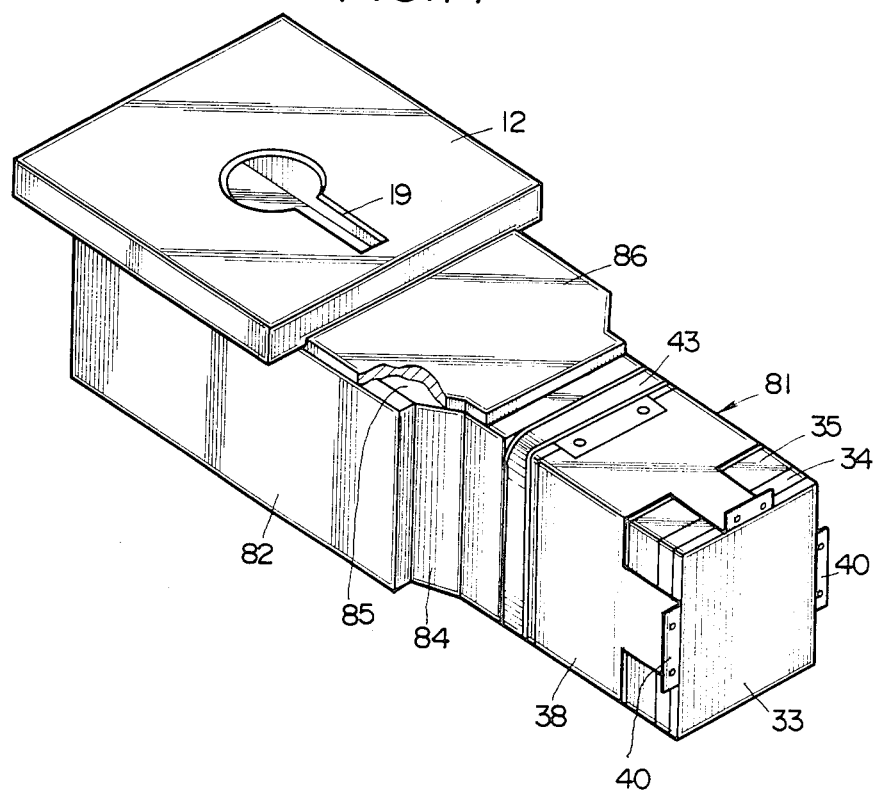

COOLING DEVICE FOR OPTICAL INFORMATION RECORDING AND REPRODUCING APPARATUS

BACKGROUND OF THE INVENTION

1. Field of the Invention

The present invention relates to a cooling device for an optical information recording/reproducing apparatus, which can cool a movable mechanism for an optical pickup housed in a casing.

2. Description of the Prior Art

Recently, there have been noticed optical information recording/reproducing apparatuses which can record information in a recording medium at high density by applying a light beam to the medium and reproduce the recorded information at high speed.

In the above-mentioned apparatus, an optical pickup mounted on a carriage is coarsely moved in the radial direction of a disk recording medium (referred to as a disk) so as to be accessible to a target track of the disk at high speed. As means for driving the pickup, a voice coil motor (referred to as VCM) is adopted. Further, in some apparatus, an external scale is used for locating the pickup.

With the VCM, since heat is generated from the driving coil, there exists a problem in that the generated heat exerts a harmful influence upon the optical system; for instance, the optical axis thereof is shifted due to thermal expansion of the system. Therefore, the heat generating section such as the VCM is required to be cooled.

Japanese Published Unexamined Patent Appl. No. 60-107789 discloses an example of prior art cooling devices, in which cooling air stream obtained by a fan mounted on a door is directly blown against a head disk assembly to be cooled. In the above prior art device, although cooling air is blown from the right or reverse side of a disk, since the fan is disposed away from the head disk assembly and therefore the cooling air is readily diffused, it is difficult to effectively cool the VCM which generates heat.

SUMMARY OF THE INVENTION

With these problems in mind, therefore, it is the primary object of the present invention to provide a cooling device for an optical information recording/reproducing apparatus, which can effectively cool a movable mechanism such as a voice coil motor which enerates heat.

It is another object of the present invention to provide a high performance cooling device therefor in spite of a simple mechanical structure.

It is still another object of the present invention to provide a cooling device therefor which can be miniaturized.

To achieve the above-mentioned object, the cooling device for an optical information recording/reproducing apparatus according to the present invention comprises: an optical pickup for collectively applying a light beam to a recording medium to record/reproduce information; a carriage for mounting the optical pickup; a movable mechanism for moving the carriage along a movement passage; a deck formed with a recessed portion for forming the movement passage; a filter; a fan; and cooling means for blowing air passed through the filter against the movable mechanism and guiding the blown air toward an exhaust side through the movement passage.

BRIEF DESCRIPTION OF THE DRAWINGS

FIGS. 1 to 5 relate to a first embodiment of the cooling device according to the present invention;

FIG. 1 is a side cross-sectional view showing an optical information recording/reproducing apparatus in which thefirst embodimentof the cooling deviceis incorporated;

FIG. 2 is a plan sectional view of FIG. 1; in which clamp means is removed;

FIG. 3 is a perspective view showing a pickup;

FIG. 4 is an exploded view showing the essential section of the first embodiment of the cooling device;

FIG. 5 is a perspective view showing an air guide member;

FIG. 6 is a perspective view showing the second embodimentof the cooling devicemounted on a deck;

FIG. 7 is a side cross-sectional view showing an optical information recording/reproducing apparatus, in which the second embodiment of the cooling device is incorporated;

FIG.8 is a plan cross-sectional view of FIG. 7;

FIG. 9 is a front cross-sectional view of FIG.7;

FIG. 10 is a plan cross-sectional view showing an optical information recording/reproducing apparatus, in which a third embodiment of the cooling device according to the present invention is incorporated; and FIG. 11 is a perspective view showing a fourth embodiment of the cooling device according to the present invention.

DETAILED DESCRIPTION OF THE PREFERRED EMBODIMENTS

Figure 1:
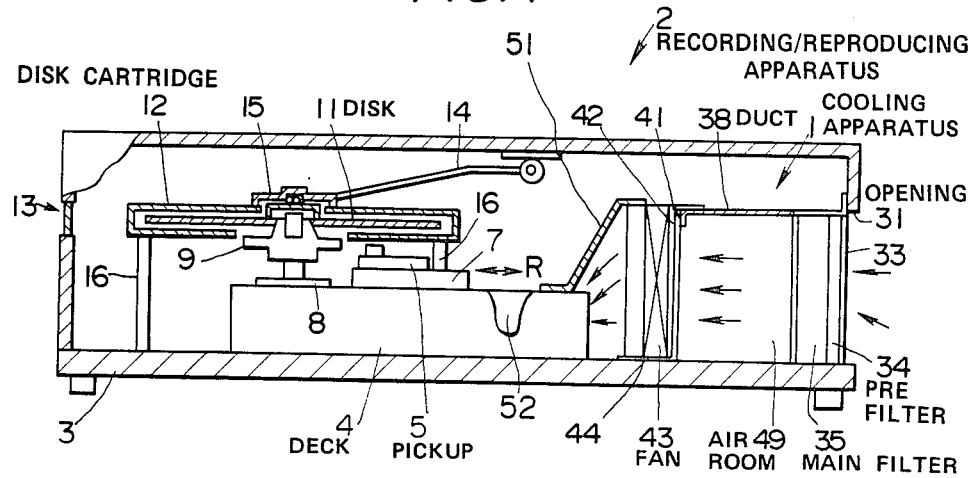
Figure 2:
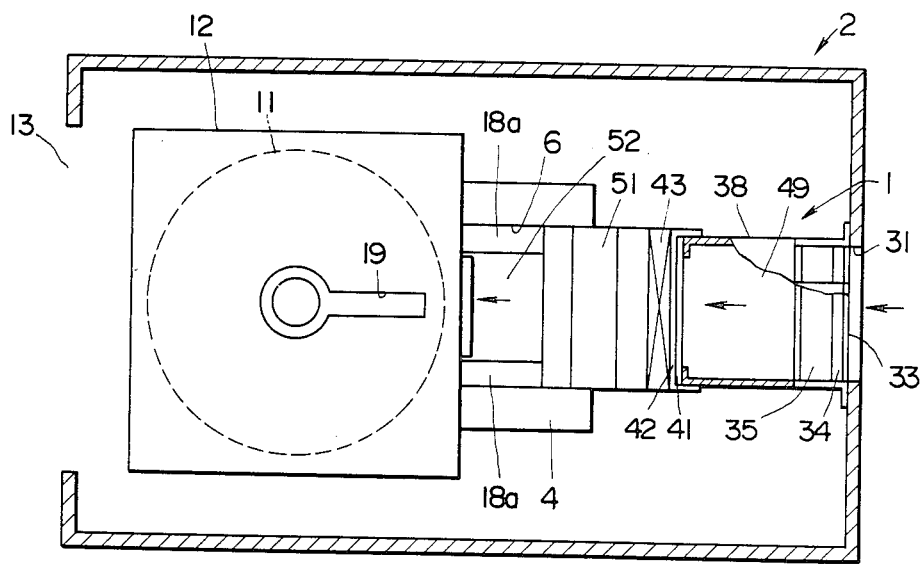
Figure 6:
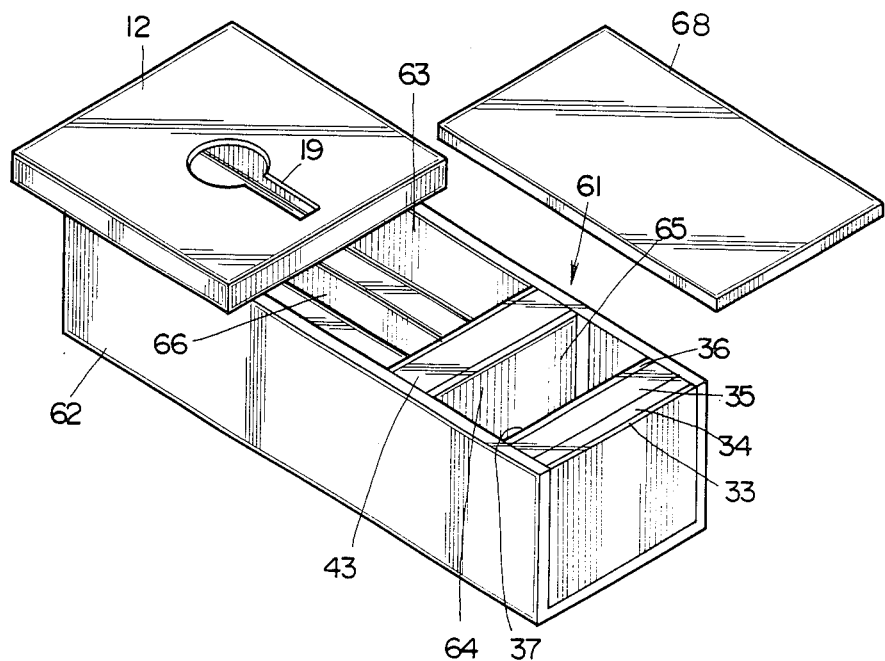
FIGS. 6 to 9 relate to a second embodiment of the cooling device according to the present invention.
Figure 7:
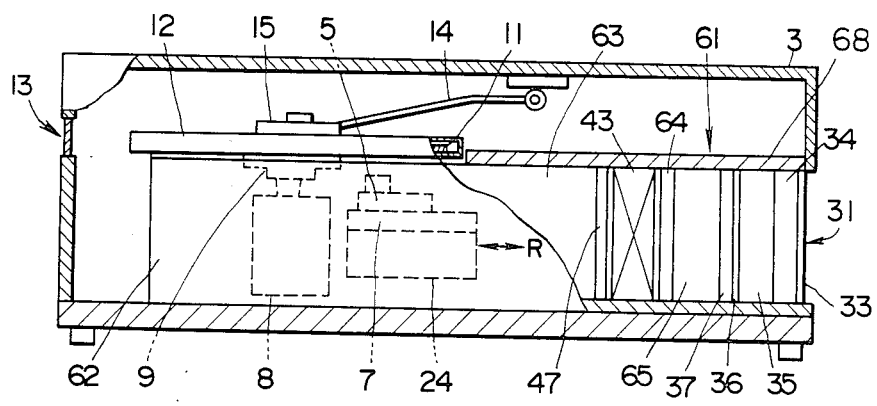
Figure 8:
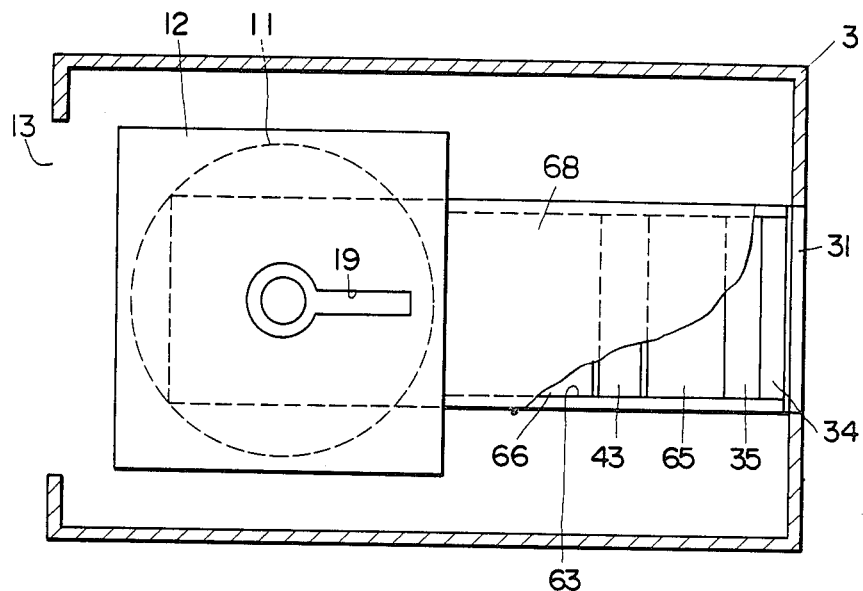

As shown is FIGS. 1 and 2, in an optical information recording/reproducing apparatus (referred to as a recording/reproducing apparatus simply hereinafter) 2 provided with a first embodiment of the cooling device 1, a deck 4 is housed within a casing 3, and an optical pickup 5 is mounted on this deck 4.

The deck 4 is formed with a recessed portion 6 of U shape in cross section, and a carriage 7 on which the optical pickup 5 is mounted is movably housed within the recessed portion 6. Further, at one end portion of this recessed portion 6, a stator of a spindle motor 8 is fixed, and a turntable 9 on which a disk is mounted is attached to the driving shaft of this motor 8.

A loading aperture 13 through which a disk cartridge 12 having a disk 11 as a recording medium can be inserted is provided at one end surface of the casing 3 along the longitudinal direction of the casing. The disk within the disk cartridge 12 is inserted through the loading aperture 13 closed by a pivotably openable cover, and mounted on the turntable 9 by the use of a moving mechanism. The disk 11 in the disk cartridge 12 is clamped by lowering a clamp member 15 attached to an end of a pivotable arm 14. Further, the disk cartridge 12 is supported by several supporting rods 16 at a predetermined mounting position.

The recessed portion 6 formed by cutting out the central upper surface portion of the deck 4 in the longitudinal direction thereof as shown in FIG. 3 also serves as a movement passage when the carriage 7 is moved. In more specifically, a pair of guide rods (or rails) 18a, 18a for guiding the movable carriage 7 are disposed on both the corners of the recessed portion. On the other hand, bearings (not shown) are disposed at both the corners near the bottom of the carriage 7 in contact with the guide rods 18a, 18a. Therefore, the carriage 7 is movable in the axial direction R of the guide rods 18a, 18a when the bearings roll over and along the guide rods.

The disk within the disk cartridge 12 can be mounted on the turntable 9 along the direction that the carriage 7 is moved. The pickup 5 mounted on the carriage 7 is movable in the radial direction of the disk 11. A slit 19 is formed in each of the both surfaces of the disk cartridge 12 at such a position as to face the pickup 5, so that an object lens of the pickup 5 is brought near the surface of the disk 11 through this slit 19. Therefore, information recorded in the disk 11 can be reproduced by applying a light beam to the disk in spot state through the object lens and receiving the light reflected from the disk. Further, information can be recorded in the disk 11 by applying a light beam stronger than in read mode onto the disk surface.

As shown in FIG. 3, as means for moving the carriage 7, a yoke 21 is disposed in the vicinity of the central lower surface of the carriage 7. A coil 22 is wound around a square bobbin throughh which this yoke 21 is loosely passed. The coil 22 is fixed to the carriage 7. Two magnets 23a, 23a are disposed on either side of the coil 22 so as to sandwich the coil 22, so that the magnetic flux reaching the yoke 21 from the magnet 23a goes across the coil 22. Therefore, when current is passed through the coil 22, a force for moving the coil 22 is produced in the axial direction R of the guide rods 18a, 18a. Owing to this force a movable mechanism 24 of a voice coil motor VCM is actuated to drive the carriage 7 to which the coil 22 is fixed.

Further, on one end surface of the carriage 7, there are provided an external scale (not shown) for detecting the stroke of the carriage 7 and a pair of light emitting element and light receiving element so as to sandwich the external scale. When the external scale moves together with the carriage 7, a light pulse signal obtained based upon the brightness and the darkness of the scale can be detected by the light emitting and receiving elements according to the stroke of the carriage, so that the carriage is detected on the basis of the number of pulses.

On the other hand, a square opening 31 for introducing cooling air is formed on the end surface of the casing 3 remote from the disk cartridge loading aperture 13. Inside of this opening 31, there are arranged cooling members as shown by the exploded view in FIG. 4.

In detail, inside the opening 31, a filter plate 33, a dust removing prefilter 34 formed with relatively coarse meshes, a dust removing main filter 35 formed with relatively fine meshes (e.g. 0.3#u, about 50%), a filter packing 36 and a packing plate 37 are fixed altogether to the inner side of mounting plates 39 of a duct 38. On the other hand, the duct 38 is fixed to the inner surface of the casing 2 by fixing mounting pieces 40 of the duct to near the opening 31 with screws. In addition, the duct 38 is fixed to the casing 3 with screws on the bottom side thereof.

On the side remote from the air inlet opening 31 at which the main filter 35 or other parts are mounted, a packing 41, a fan plate 42, a fan 43, and a fan plate 44 are fixed to the duct 38 with long screws 45. Further, the fan plate 42 can be fixed by inserting screws 46, 46 into threaded holes formed on the upper surface of the duct 38. Other packings 47, 47 are used for the fan plate 44.

In the above-mentioned cooling device, the prefilter 34, the main filter 35 and a fan 43 are arranged separately on both the sides of the duct 38, so that the duct 38 can provide an air cleaning room 49 which serves as a cooling air guide passage while preventing dust or surrounding hot air from being introduced from the outside, that is, the cooling efficiency from being reduced.

Owing to this duct 38, a clean air is introduced through the air inlet opening 31, being passed through the air room 49 of the duct 38, and then blown against the deck 4 by the fan 43.

To permit the cooling air introduced by the fan 43 to effecively be blown against the deck 4 to be cooled, an air guide frame member 51 is provided, as shown is FIG. 5, between the fan 43 and the end surface of the recessed portion 6 of the deck 4. This air guide frame member 51 is formed in shape in such a way that a square opening 51a is provided on the side facing the fan 43, an inclined surface section 51b for throttling the air introduced through the opening 51a is provided midway; and a rectangular opening 51c on the lower side of the inclined surface section 51b is provided on the side remote from the fan 43 to blow air against the recessed portion 6.

Owing to the above air guide frame member 51, the cooling air introduced by the fan 43 travels with the carriage movement passage as an air guide passage 52. As described above, since the movement passage of the carriage 7 is utilized as the air guide passage 52, it is possible to increase the quantity of cooling air to be fed and thus the cooling efficiency. Further, when being fed along the recessed portion 6, the cooling air is blown against the coil 22 of the VCM attached on the lower side of the carriage 7 and easily generating heat in order to effectively suppress a rise in temperature of the coil.

Further, since air is fed along the movement passage of the carriage 7, it is possible to remove dust adhered onto the external scale, thus providing a reliable detection of the carriage stroke (if dust attached on the scale, the stroke is difficult to be detected). Therefore, the detection operation becomes stable for a long time.

The cooling air having been passed through the movement passage of the carriage 7 is exhausted through an exhaust port (not shown) disposed on the side or bottom surface of the casing 3. Further, in FIG. 1, it is preferable to smoothly guide the cooling air toward the recessed portion 6 of the deck 4 by inclining the lower side of the rectangular opening 51c formed on the outlet side of the air guide frame member 51.

In the first embodiment as constructed above, the filter members such as the prefilter 34 for removing small-diameter dust and the main filter 35 for removing large-diameter dust are both disposed at the air inlet opening 31 open to the outside; the filter members communicate with the fan 43 via the air room 49 formed by the duct 38 isolated from the outside; and cooling air introduced by the fan 43 is guided toward the movement passage of the carriage 7 by the presence of the air guide frame member 51. Therefore, it is possible to increase the quantity of cooling air and thus to enhance the cooling efficiency. Further, since cooling air is effectively blown against the VCM coil 22 which easily generates heat, it is possible to disperse the heat generated thereby, thus preventing an offset of an optical axis of the optical system due to heat. Further, it is possible to prevent dust from being adhered onto the scale and the surface of the object lens. Furthermore, the device of the first embodiment provides such an effect that it is possible to reduce the harmful influence of dust upon the pickup together with the cooling effect.

Table 1 shows practical measured results indicating the fact that the cooling device of the present invention can reduce the influence of dust.

TABLE 1

| | The number of dust particles measured by a particle counter and classified according to particle diameters. | | | | |
|---|---|---|---|---|---|
| | Particle diameters (um) | | | | |
| Measured position | 0.3 or more | 0.5 or more | 1 or more | 2 or more | 5 or more |
| No. 1: Outside or near louver on rear cover | 40000 | 3500 | 50 | 10 | 0 |
| No. 2: Within disk cartridge when motor and fan are driven | 15000 | 1000 | 5 | 0 | 0 |

In the measurement No. 1 in the above table, the number of dust particles was measured with a particle counter in the external environment. In the measurement No. 2, the number of dust particles was measured with the same counter under the operating conditions such that a disk cartridge12 was mounted on the turntable 9; the motor 8 and the fan 43 were both turned on; and a dust measuring sensor was inserted into the disk cartridge 12. The Table 1 indicates that dust prevention effect is excellent in the device of the first embodiment.

In the above-mentioned first embodiment, since air is blown against the movement passage of the carriage 7 by cooling means using the fan 43 to cool the movable mechanism 24 such as the VCM which easily generate heat and additionally the carriage movement passage is utilized as an air guide passage, the quantity of air to be fed is great and therefore the cooling effect is high. Further, since the carriage movement passage is used in common as an air guide passage, it is unnecessary to provide an additional air guide passage, so that the device is miniaturized. Furthermore, since the air guide passage is formed in the vicinity of the movable mechanism, the used cooling air can effectively be guided toward the exhaust side.

With reference to FIGS. 6 to 9, a second embodiment of the cooling device 61 of the present invention will be described hereinbelow.

The cooling device 61 is arranged to a recessed portion 63 of a deck 62 having a length and a height greater than in the deck 4 of the first embodiment.

On the central upper surface of the deck 62, the recessed portion 63 is formed being cut out in the longitudinal direction thereof. Within this recessed portion 63 and on the side of a disk loading aperture 13, the spindle motor 8, the carriage 7 having the pickup 5 and the movable mechanism 24 for the carriage 7 are arranged in the same way as in the first embodiment. Therefore, on the other side of the recessed portion 63 remote from the loading aperture 13, the cooling device 61 of the second embodiment is arranged. Further, the other end of the recessed portion 63 is located at a position facing the air inlet opening 31. Toward the opening 31, the filter plate 33, the prefilter 34, the main filter 35 the filter packing 36, the packing plate 37, etc. are all fitted to the recessed portion 63 of the deck 3, and fixed with screws at appropriate positions.

In this embodiment, the duct 38 used in the first embodiment is not adopted but rather an air room 65 is formed by a space intervening between the packing plate 37 and another packing plate 64 disposed an appropriate distance spaced away from the plate 37.

Clean air passed through this air room 65 is blown by the fan 43 against the movable mechanism 24 disposed facing the fan 43. In this embodiment, the upper open space of the recessed portion is partially covered by the disk cartridge 12 inserted from the loading aperture 13, and only the upper open space not covered by the cartridge 12 is covered by an upper lid 68. Therefore, the air introduced by the fan 43 travels in roughly a straight line with the recessed portion 63 covered by the disk cartridge 12 and the upper lid 68 as the air guide passage 66, and the cooling air is blown against the movable mechanism 24 disposed facing the fan 43 to effectively cool the VCM coil 22 which generates heat. The air blown against the movable mechanism 24 is passed through the movement passage of the carriage 7, and additionally part of the air is passed through a space under the disk cartridge 12. The air passing through the space under the disk cartridge 12 can blow off dust adhered on the surface of the object lens and the disk 11 facing each other to clean both the surfaces. Therefore, the above cooling air is very effective as dust prevention countermeasures when the apparatus is used for a long time.

Figure 9:
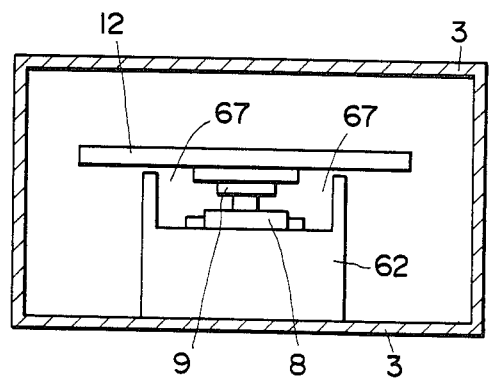

The air passing through the movement passage of the carriage 7 or the space under the disk cartridge 11 travels through exhaust passages 67, 67 shown in FIG. 9 and then exhausted toward the outside from an exhaust port (not shown).

The operational effect of the second embodiment is substantially the same as in the first embodiment. However, there exist the following additional features: The cooling air blown against the movable mechanism 24 travels not only through the movement passage under the movable mechanism 24 but also through the surrounded space under the disk cartridge 11 toward the exhaust passages 67, 67 without diffusion. Therefore, it is possible to obtain a still larger amount of cooling air, and additionally it is possible to blow off dust on the object lens while cooling the heat generating element.

FIG. 10 shows a third embodiment of the cooling device 71. In this embodiment, the cooling device 71 is disposed at one corner near the rear surface of the casing 3, being offset from the center of the casing 3, so that a relatively large space 72 can be reserved at the other corner so as to arrange electric systems such as recording/reproducing control system, signal processing system, interface with an outer apparatus, etc.

Therefore, the air sent by the fan 43 travels obliquely from the line connecting between the fan 43 and the air inlet opening 31 toward the recessed portion 6 of the deck 4 through an air guide passage 74 formed by an air guide frame 73, as shown by the arrow B in FIG. 10. Further the upper side of the recessed portion 6 is covered by the cartridge 12 and the upper lid 75.

The structure of the cooling device 71 is almost the same as that shown in FIG. 4. This third embodiment can make compact the recording/reproducing apparatus including the cooling device.

FIG. 11 shows a fourth embodiment of the cooling device 81 of the present invention. In this embodiment, the cooling device 81 is so designed as to be equal in height to the deck 82 in which the movable mechanism is housed, but different in width from the deck 82. Since the width of the deck 82 is wider than that of the cooling device 81, cooling air introduced by the fan 43 travels through the air guide passage 85 formed by a flared air guide frame 84 and is blown against the movable mechanism. In the same way, the upper side of the deck 82 is covered by the cartridge 12 and the upper lid 86. However, the upper open side of the recessed portion can be covered by the disk 11 itself without being limited to the disk cartridge 12 housing the disk 11. Further, where the apparatus is provided with a guide member for guiding the disk or the cartridge to the recording/reproducing operation position, the upper open side can be covered by this guide member.

The present invention can be applied to a recording/reproducing apparatus using a card-like recording medium without being limited to a rotatably driven recording medium. Furthermore, the present invention can be applied to the apparatus including the movable mechanism other than formed by a voice coil motor.

As many apparently widely different embodiments of this invention may be made without departing the spirit and scope thereof, it is to be understood that the invention is not limited to the specific embodiments thereof except as defined in the appended claims.

What is claimed is:

1. A cooling device for an optical information recording/reproducing apparatus including:
   a casing for housing an optical information recording/reproducing apparatus;
   a recording medium removably housed within said casing;
   an optical pickup for recording/reproducing information in or from said recording medium by collectively applying a light beam to said medium;
   a carriage for installing said optical pickup; and
   a movable mechanism formed near said carriage for moving said carriage along a movement passage;
   characterized by:
   a deck formed with said carriage movement passage and a recessed portion for housing said movable mechanism; and
   cooling means having a filter and a fan, for blowing air introduced through the filter by the fan directly against said movable mechanism and for guiding the blown air toward an exhaust side through said carriage movement passage.

2. The device as set forth in claim 1, wherein an upper open side of said deck is covered by a lid.

3. The device as set forth in claim 2, wherein said lid is composed of said recording medium and a plate member for covering a portion not covered by said recording medium.

4. The device as set forth in claim 3, wherein cooling air introduced by the fan of said cooling means is guided through said movement passage and additionally through a space formed between said recording medium and a surface of an object lens disposed so as to face said recording medium and constituting said optical pickup, to remove dust adhered on the surfaces of said recording medium and the object lens.

5. The device as set forth in claim 2, wherein said lid is composed of a cartridge having said recording medium and a plate member for covering a portion not covered by said cartridge.

6. The device as set forth in claim 5, wherein cooling air introduced by the fan of said cooling means is guided through said movement passage, and additionally through a space formed between said disk cartridge and a surface of an object lens disposed so as to face said disk cartridge and constituting said optical pickup, to remove dust adhered on the surfaces of said disk cartridge and the object lens.

7. The device as set forth in claim 1, wherein said cooling means is disposed within the recessed portion for housing said movable mechanism of said deck in such a way as to face said movable mechanism.

8. The device as set forth in claim 1, wherein said cooling means is disposed at a corner of said casing, air introduced by said fan being guided toward said movable mechanism housed in the recessed portion of said deck via an air guide frame.

* * * * *